(12) United States Patent
Kaminski et al.

(10) Patent No.: US 8,300,595 B2
(45) Date of Patent: Oct. 30, 2012

(54) METHOD FOR HANDOVER PROCEDURE OF USER TERMINAL ON RADIO INTERFACES, A BASE STATION AND A NETWORK THEREFOR

(75) Inventors: Stephen Kaminski, Eislingen (DE); Anton Ambrosy, Tiefenbronn (DE)

(73) Assignee: Alcatel Lucent, Paris (FR)

( * ) Notice: Subject to any disclaimer, the term of this patent is extended or adjusted under 35 U.S.C. 154(b) by 788 days.

(21) Appl. No.: 11/762,761

(22) Filed: Jun. 13, 2007

(65) Prior Publication Data

US 2008/0318573 A1    Dec. 25, 2008

(30) Foreign Application Priority Data

Jun. 20, 2006    (EP) ..................... 06115704

(51) Int. Cl.
H04W 4/00    (2009.01)
(52) U.S. Cl. .......................... 370/331; 455/346; 455/444
(58) Field of Classification Search .......... 455/436–444; 370/331
See application file for complete search history.

(56) References Cited

U.S. PATENT DOCUMENTS

| | | | | |
|---|---|---|---|---|
| 6,519,457 | B1 * | 2/2003 | Jiang et al. | 455/442 |
| 7,697,482 | B2 * | 4/2010 | Nakano | 370/331 |
| 2004/0082330 | A1 * | 4/2004 | Marin | 455/438 |
| 2005/0192010 | A1 * | 9/2005 | Kirla | 455/438 |

FOREIGN PATENT DOCUMENTS

WO    WO 00/74420 A1    12/2000
WO    WO 2005/120183 A2    12/2005

OTHER PUBLICATIONS

Third Generation Partnership Project, 3GPP: "TR 25.912, Feasibility Study for Evolved UTRA and UTRAN, Release 7" Jun. 12, 2006, XP002411616.
PowerPoint presentation "CH4. WiMAX core Netrork.ppt", Advanced Network Technology, obtained from internet on Jun. 29, 2010 at: http://ant.comm.ccu.tw/index.php?menu=m2i1&course name=97 ITS&course dir+0 Lecture.
"LTE Connected Mode Mobility", Tdoc R3-060209, 3GPP, published by Ericsson on Feb. 13, 2006 (URL; http://www.3gpp.org/ftp/tsg_ran/WG3_lu/TSGR3_51/docs/R3-060209.zip).
"Bi-Casting Call Flow (Option U-4)", 3GPP TSG RAN3 Meeting #51, R3-060189, 3GPP, published by Nortel Networks on Feb. 13, 2006 (URL; http://www.3gpp.org/ftp/tsg_ran/WG3_lu/TSGR3_51/docs/R3-060189_bicastingcallflow.zip).

* cited by examiner

Primary Examiner — Jinsong Hu
Assistant Examiner — Michael Nguyen
(74) Attorney, Agent, or Firm — Fay Sharpe LLP

(57)    ABSTRACT

The invention concerns a method for a handover procedure of a user terminal (UE) on radio interfaces from a source base station (SBS) to a target base station (TBS) whereby the target base station (TBS) sends out user data to the user terminal (UE) before reception of a message indicating the termination of the handover procedure (HO Complete), the user terminal (UE) uses an uplink feedback for sending at least one message (Feedback) associated to the downlink transmission of said user data to the target base station (TBS), and the target base station (TBS) uses said at least one message (Feedback) associated to the downlink transmission of said user data as an indication of the presence of the user terminal (UE) within the range of the target base station (TBS), a base station (BS1-BS8) and a network (CN) therefor.

16 Claims, 3 Drawing Sheets

METHOD FOR HANDOVER PROCEDURE OF USER TERMINAL ON RADIO INTERFACES, A BASE STATION AND A NETWORK THEREFOR

BACKGROUND OF THE INVENTION

The invention is based on a priority application EP06115704.6 which is hereby incorporated by reference.

The invention relates to a method for a handover procedure of a user terminal on radio interfaces according to the preamble of claim 1, a base station according to the preamble of claim 9, and a network according to the preamble of claim 10.

Orthogonal frequency division multiplexing (OFDM) radio systems are currently under discussion in many places as e.g. in Third Generation Partnership Project Long Term Evolution (3GPP LTE), the WiFi standard IEEE 802.11 or the WiMax standard IEEE 802.16.

For the UMTS LTE (UMTS LTE=Universal Mobile Telecommunication System Long Term Evolution), it is currently discussed, how the access procedure shall be performed on a high level. The evolved UTRAN Node B (UTRAN=UMTS Terrestrial Radio Access Network), called eNodeB, to which the user terminal will switch is called the target eNodeB or target base station, while the old eNodeB, from which the user terminal will leave is called the source eNodeB or source base station.

During any (hard) handover in a mobile communications network, the user terminal, i.e. the User Equipment (UE) in UMTS, has to change its communication link(s) to another eNodeB. For this purpose so-called Random Access Channels (RACH) are provided on each air interface. The user terminal first listens to the frame structure of the target air interface to gather synchronisation with the target eNodeB. Then the Random Access Channel is used to send the first message from the user terminal to the target eNodeB. From this point in time the user terminal is associated with the target eNodeB and the message exchange is performed.

SUMMARY OF THE INVENTION

Problems may occur during the Random Access, as there might be another user terminal trying to access the same target eNodeB via the same Random Access Channel resources at the same time. This leads to collisions that prevent both user terminals from gathering access to the eNodeB. Until the user terminal did not succeed in registering at the target eNodeB, no user data is sent towards the user terminal. This leads to increased delay for user data during handover, especially in cases when collisions occur on the Random Access Channel.

One solution to the above described problem is to set an arbitrary timer in each user terminal before the user terminal tries to access the target eNodeB again. Usually the minimum value of such timers are increased with every unsuccessful trial. This solution has the drawback of increased handover latency. Another solution is to assign radio resources in the uplink direction prior to the change of the air interfaces during the preparation phase. In this case the collisions are avoided, and it is ensured that the user terminal can access as soon as it is synchronized.

In the above mentioned solutions the target eNodeB cannot transmit any user data before the user terminal has registered itself by sending a first message to the target eNodeB.

As the invention is not restricted to 3GPP LTE but can in principle be applied in any network that provides handover procedures, in the following, instead of the term eNodeB, the more general term base station is used.

The invention is described within the framework of evolved UTRAN, however the invention is not restricted to networks using OFDM transmission, as the modulation technique is not subject of the invention.

The object of the invention is thus to propose a method for reducing the latency during a handover procedure.

This object is achieved by a method according to the teaching of claim 1, a base station according to the teaching of claim 9, and a network according to the teaching of claim 10.

The main idea of the invention is to transmit user data as soon as the target base station expects the user terminal being able to receive data instead of waiting for the user terminal to register, which will shorten the latency during handover.

The target base station sends out user data to the user terminal without waiting for reception of a message indicating the termination of the handover procedure. Then, the user terminal uses an uplink feedback for sending at least one message associated to the downlink transmission of said user data to the target base station. The target base station in turn uses said at least one message associated to the downlink transmission of said user data as an indication of the presence of the user terminal within the range of the target base station.

The method according to the invention is fully compliant with the procedure described in chapter 9.4 on pages 32-34 of 3GPP TR 25.912 V0.1.7 (2006-06): "Feasibility Study for Evolved UTRA and UTRAN (Release 7)", which is regarded as the closest prior art.

Further developments of the invention can be gathered from the dependent claims and the following description.

BRIEF DESCRIPTION OF THE DRAWINGS

In the following the invention will be explained further making reference to the attached drawings.

A network in which the invention can be implemented comprises user terminals and base stations.

Figure 1:
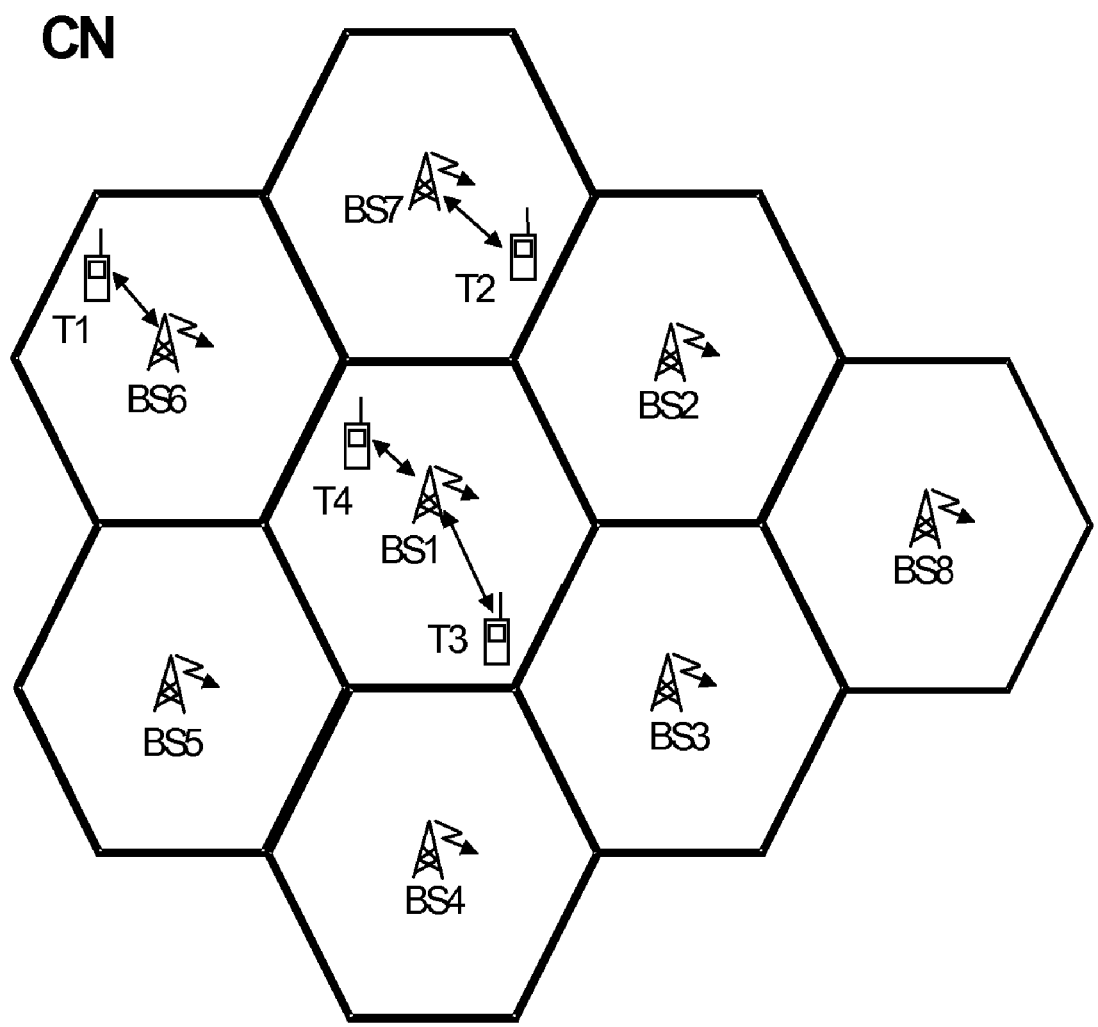
FIG. 1 schematically shows a network in which the invention can be implemented.

FIG. 1 shows an example for such a network CN that comprises base stations BS1-BS8 and user terminals T1-T4.

Each of said user terminals T1-T4 is connected to one or multiple of said base stations BS1-BS8, which is symbolized by double arrows in FIG. 1. The base stations BS1-BS8 are in turn connected to a core network, which is not shown in FIG. 1 for the sake of simplicity.

The user terminals T1-T4 comprise the functionality of a user terminal for transmission and reception of signaling and data messages in a network using radio transmission.

The base stations BS1-BS8 comprise the functionality of a base station of a network using radio transmission, i.e. they provide the possibility for user terminals to get connected to said network and for data exchange of said user terminals by means of radio transmission.

Furthermore, a base station BS1-BS8 according to the invention in a network using radio transmission is adapted for taking over a user terminal T1-T4 from another base station BS1-BS8 during a handover procedure, whereby said base station comprises at least one processing means adapted to perform sending out user data to the user terminal without waiting for reception of a message indicating the termination of the handover procedure, and adapted to perform using an uplink feedback for sending at least one message associated to the downlink transmission of said user data as an indication of the presence of the user terminal within the range of the base station.

Figure 2:
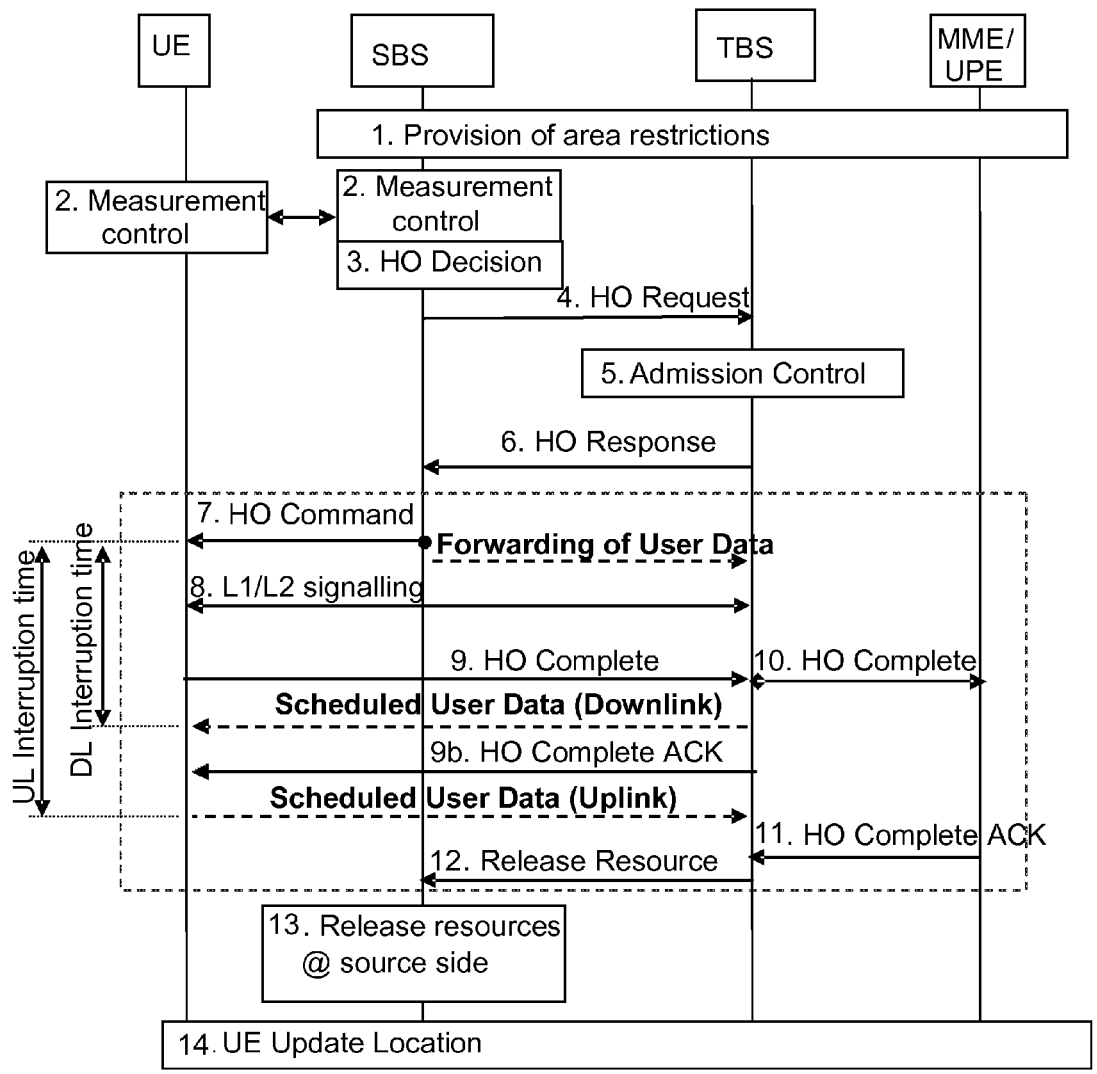
FIG. 2 schematically shows exemplarily the information flow for Intra-LTE-Access Mobility Support.

FIG. 2 shows the information flow for Intra-Long-Term-Evolution-Access Mobility Support based on the prior art disclosed in chapter 9.4 of 3GPP TR 25.912 V0.1.7 (2006-06) which will be described in the following.

In step 1, either during connection establishment or at the last Tracking Area (TA) update, the user terminal UE context containing area restriction information regarding roaming restrictions is provided to the source base station SBS.

In step 2, the source base station SBS entity configures the UE measurement procedures according to the area restriction information. Measurements provided by the source base station SBS entity may assist the function controlling the user terminals connection mobility.

In step 3, based on measurement results from the user terminal UE and the source base station SBS, probably assisted by additional radio resource management specific information, the source base station SBS decides to handover the user terminal UE to a cell controlled by the target base station TBS.

In step 4, the source base station SBS issues a handover request (HO request) to the target base station TBS entity passing necessary information to prepare the handover at the target side. The target base station TBS configures the required resources In step 5, Admission Control is performed by the target base station TBS to check whether the resources can be granted by target base station TBS to increase the likelihood of a successful handover.

In step 6, the handover preparation is finished at the target side, and information for the user terminal UE to reconfigure the radio path towards the target side is passed to the source base station SBS.

From step 7 until 12, which will be described in the following, means to avoid data loss during handover are provided. Details for this procedure are given in §9.4.2.2.2 of 3GPP TR 25.912 V0.1.7 (2006-06).

In step 7, the user terminal UE is commanded by the source base station SBS entity to perform the handover, and target side radio resource information is contained in the handover command (HO command). When the HO command has been sent, the source base station SBS begins forwarding of user data to the target base station TBS.

In step 8, the user terminal UE gains synchronization at the target side.

In step 9, once the user terminal UE has successfully accessed the cell, the user terminal UE sends an indication to the target base station TBS that the handover is completed (HO complete message). After reception of the HO complete message, the target base station TBS may begin sending user data to the user terminal UE.

In step 9b, the target base station TBS confirms the reception of the HO complete message by means of sending the acknowledge message HO complete ACK to the user terminal UE. After reception of the HO complete ACK message, the user terminal UE begins sending user data to the target base station TBS.

In step 10, the mobility management entity/user plane entity MME/UPE is informed that the user terminal UE has changed cell. The user plane entity switches the data path to the target side and can release any user-plane/transport network layer resources towards the source base station SBS.

In step 11, the mobility management entity/user plane entity MME/UPE confirms the "HO Complete" message with the "HO Complete ACK" message.

In step 12, the target base station TBS triggers the release of resources at the source side. The target base station TBS can send this message directly after reception of the "HO complete" message in step 9.

In step 13, upon reception of the release resource message from step 12, the source base station SBS can release radio and control-plane related resources in relation to the UE context. The source base station SBS should continue to perform data forwarding until an implementation dependent mechanism decides that data forwarding can be stopped and user-plane/transport network layer resources can be released.

In step 14, if the new cell is member of a new Tracking Area (TA), the user terminal UE needs to register with the mobility management entity/user plane entity MME/UPE which in turn updates the area restriction information on the target side.

According to the prior art procedure for synchronization to the target base station TBS, the user terminal UE performs measurements of other radio cells and listens for predefined resources, such as pilot symbols, synchronization channel(s) SCH and broadcast channel(s) BCH. As soon as a predefined pattern is found, the user terminal UE is synchronized with the target base station TBS for downlink reception.

During Handover, the basic synchronization from the measurement phase is still available, but the timing advance, necessary for uplink transmission within the user terminal UE, for the target base station TBS is not yet known. Thus user terminal UE and target base station TBS exchange corresponding signaling information to evaluate the timing advance. To complete the handover, the user terminal UE sends an initial message "HO Complete" within the random access channel RACH towards the target base station TBS.

Only after the reception of the "HO Complete" message the target base station TBS can send first downlink data to the user terminal UE, which terminates the interruption time of downlink data, i.e. the time span since the reception of the HO command message. The interruption time of uplink data is much longer, because the user terminal UE can send first uplink data only after the reception of the "HO Complete ACK" message.

The above mentioned method for the handover execution phase can be improved according to the invention with respect to the interruption time by the following mechanism, which describes at first a procedure for downlink data.

Figure 3:
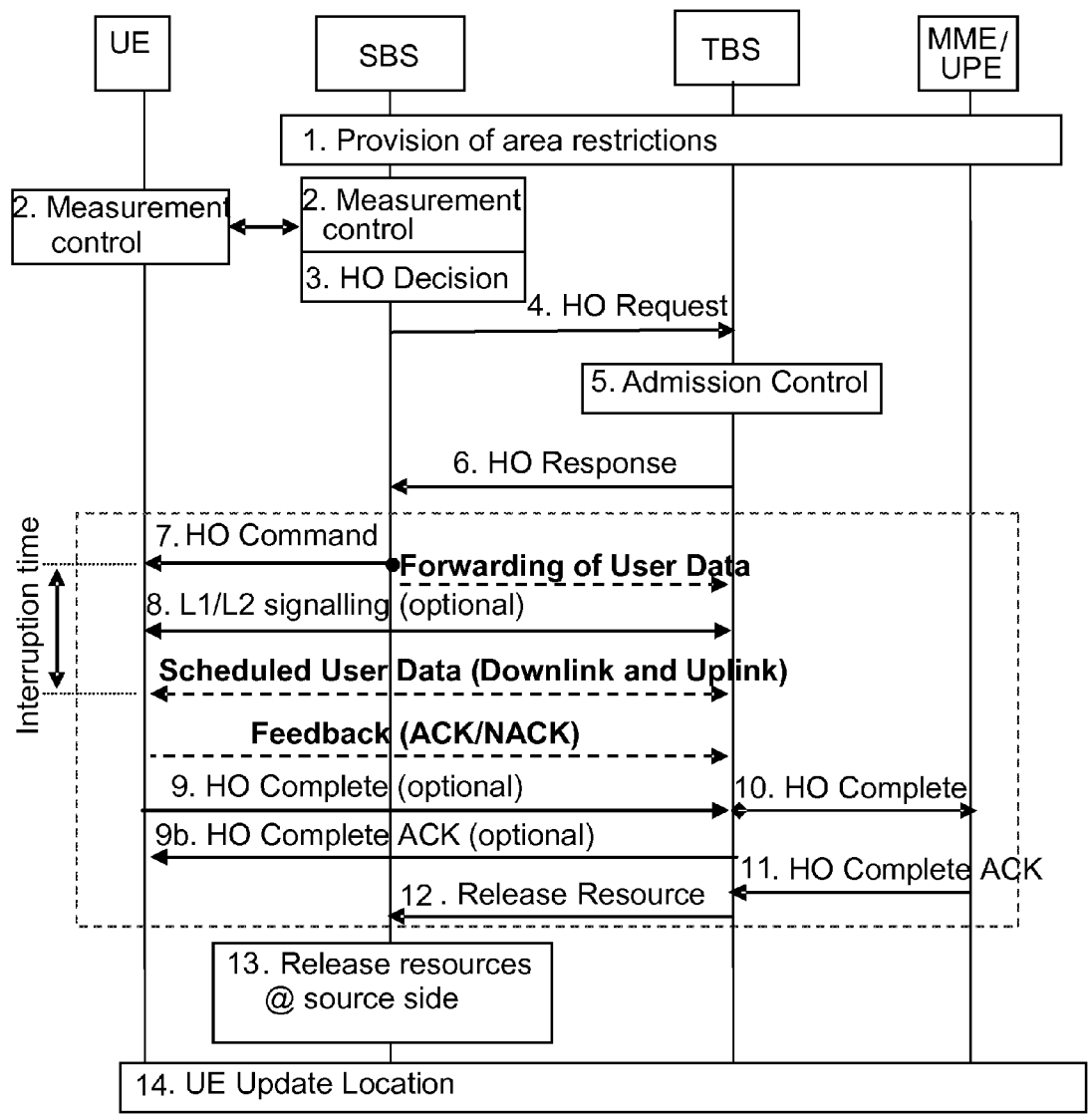
FIG. 3 schematically shows exemplarily the information flow for Intra-LTE-Access Mobility Support with reduced handover latency according to the invention.

In FIG. 3, the information flow for Intra-LTE-Access Mobility Support with reduced interruption time according to the invention is shown. In the following, the differences with respect to the prior art disclosed above will be described on the basis of FIG. 3.

The steps 1-14 as described for the prior art above all occur in FIG. 3 and have basically the same meaning.

The uplink feedback denoted "Feedback" in FIG. 3 and associated to the downlink user data transmission at the target base station TBS can be used as an indication of the presence of the user terminal UE. Instead of waiting for the arrival of the user terminal UE, the target base station TBS can already schedule the user terminal UE and thus sends out user data as soon as the target base station TBS expects the arrival of the user terminal UE. Therefore, the scheduling of user data according to the invention occurs different to the prior art before step 9, i.e. before the sending of the "HO complete" message from the user terminal UE to the target base station TBS.

The new identification, i.e. address assigned to the user terminal UE, in the target base station TBS is already transferred to the source base station SBS during the handover preparation phase, which comprises the above mentioned steps 2 to 6, and the source base station SBS in turn passes on this information to the user terminal UE within the "HO Command" message.

As the target base station TBS does not yet know about the real radio conditions, it preferably sends the user data with a robust modulation and coding scheme. Transmission of the user data can either be performed by corresponding announcement in the downlink control channel or within predefined radio resources. By detection of the corresponding feedback signal (usually an ACK or NACK message), the target base station TBS can implicitly know if the user terminal UE is already present.

The target base station TBS receives an ACK or NACK message with a certain signal strength. When the user terminal UE is not yet synchronised, the target base station TBS will not receive anything, although it will try to demodulate and decode the expected feedback signal. The receiver might interpret the noise as ACK or NACK by chance but the signal strength would be very low in this case. Hence, both unsuccessful feedback reception or any feedback reception with a very low signal strength are interpreted as "UE not yet present".

This information is passed in the target base station TBS internally, and the currently according to the state of the art required dedicated indication by the use of a "HO Complete" message sent from the user terminal UE to the target base station TBS is not needed. Therefore, for the method according to the invention, steps 9 and 9b, i.e. the messages "HO complete" and "HO complete ACK" are optional, as the "Feedback" message is used as an indication for the presence of the user terminal UE within the range of the target base station TBS. However this cannot be precluded, because if there are no user data available during the execution phase, which comprises the above mentioned steps 7 to 14, the handover procedure works as in the prior art described above. The virtual handover interruption time would be the same as without the proposed enhancement according to the invention in this case, but as there is no user data affected, it will not be a real interruption time.

Finally, the target base station TBS announces downlink resources and sends out scheduled user data on these resources for the incoming user terminal UE as soon as it expects the user terminal UE being ready for the reception. The user terminal UE can then receive the user data on these resources.

A similar improvement with respect to the interruption time can be achieved in uplink direction. In this case either timing advance is evaluated by the target base station TBS, which sends the current frame number and transmission time to the source base station TBS during the preparation phase, or if the frames are identified uniquely in synchronous networks, the user terminal UE can evaluate the timing advance for the target base station TBS autonomously. The uplink resources may be predefined or also sent, e.g. together with the timing advance, from the target base station TBS via the source base station TBS to the user terminal UE during the handover preparation phase.

In the method according to the invention, step 8, i.e. the synchronisation of the user terminal with the target base station TBS, is only optional, as the synchronisation of the user terminal with the target base station TBS can already be performed during the handover preparation phase, which comprises the above mentioned steps 2 to 6.

Therefore, much shorter interruption times can be achieved for downlink and uplink data during handover with the method according to the invention.

In an embodiment of the invention, instead of using uplink feedback, i.e. ACK/NACK indications, the user terminal UE sends this information via the random access channel as long as it did not receive any timing advance value from the target base station TBS.

In an embodiment of the invention, as long as no timing advance value exists in the target base station TBS, it assigns uplink resources in a way that it can receive the uplink transmission even without exact timing relation between downlink and uplink. Resources are assigned for a longer period of time, i.e. duration for the transmission plus maximum propagation delay.

In an embodiment of the invention, during the "HO Response" message from the target base station TBS to the source base station SBS, the target base station TBS can already indicate some downlink and/or uplink resources within which the first user data will be scheduled for the newly arriving user terminal UE. The source base station SBS sends this resource information to the user terminal UE within the "HO Command" message. The user terminal UE can now listen to these resources for data reception directly without necessity for demodulation and decoding of any announcement, i.e. downlink signalling. The announcement may however still be sent out from the target base station TBS.

In an embodiment of the invention, the amount of downlink resources assigned to a user terminal UE intended to be taken over for the above mentioned synchronisation purpose depends on the current load situation of the target base station TBS. However the amount of resources should be kept low until the actual radio condition is available in the target base station TBS.

In an embodiment of the invention, to increase the efficiency of the first transmission of user data, the source base station SBS sends the measurement report of the user terminal UE to the target base station TBS during the preparation phase, e.g. within the "HO Request" message. Then the target base station TBS can select the radio resources with best expected quality and apply a less robust modulation and coding scheme, fitting the radio conditions better than without this information.

The invention claimed is:

1. A method for a handover procedure of a user terminal on radio interfaces from a source base station (SBS) to a target base station the method comprising, using the target base station, sending downlink transmission of u-plane user data to the user terminal before the target base station receives a message indicating termination of the handover procedure;

using the target base station, receiving at least one uplink feedback message associated to the downlink transmission of said u-plane user data from the user terminal, wherein the at least one uplink feedback message is an acknowledgment (ACK) or a negative acknowledgment (NACK) received from the user terminal independent of receipt of uplink u-plane user data from the user terminal; and wherein the target base station uses said at least one message associated to the downlink transmission of said u-plane user data as an indication of the presence of the user terminal within the range of the target base station, wherein the target base station sends u-plane user data to the user terminal after any uplink or downlink control L1/L2 signaling associated with the handover procedure and prior to reception of the message indicating the termination of the handover procedure; and wherein the message indicating the termination of the handover procedure is one of an HO complete message and a Feedback (ACK/NACK) message.

2. A method according to claim 1, wherein the identification of the user terminal in the target base station is transferred from the target base station to the source base station, which in turn transfers said identification to the user terminal.

3. A method according to claim 1, wherein said u-plane user data are sent with modulation and coding schemes that are appropriate for poor radio conditions.

4. A method according to claim 1, wherein if the target base station does not receive said at least one message associated to the downlink transmission of said u-plane user data or only receives said at least one message associated to the downlink transmission of said u-plane user data with a signal strength below a certain threshold, the target base station interprets that the user terminal is not yet receiving said downlink transmission of said u-plane user data.

5. A method according to claim 1, wherein no message only indicating that the handover is complete is sent from the user terminal to the target base station.

6. A method according to claim 1, wherein said at least one message associated to the downlink transmission of said u-plane user data is sent via a random access channel if the user terminal has not yet received any timing advance value from the target base station.

7. A method according to claim 1, wherein the target base station indicates in a handover response message that is sent to the source base station at least one downlink resource that will be used for scheduling first user data to the user terminal.

8. A method according to claim 1, wherein before a first transmission of u-plane user data from the target base station, the source base station sends a measurement report indicating radio channel quality of the user terminal to the target base station, and wherein the target base station selects an appropriate modulation and coding scheme for the u-plane user data based on said measurement report.

9. A base station in a network using radio transmission adapted for taking over a user terminal from another base station during a handover procedure, wherein said base station is operative to:

send downlink transmission of u-plane user data to the user terminal before reception of a message indicating termination of the handover procedure;

receive at least one uplink feedback message associated to downlink transmission of said u-plane user data from the user terminal, wherein the at least one uplink feedback message is an acknowledgment (ACK) or a negative acknowledgment (NACK) received from the user terminal independent of receipt of uplink u-plane user data from the user terminal; and use said at least one uplink feedback message as an indication of the presence of the user terminal within a range of the base station;

the base station sends u-plane user data to the user terminal after any uplink or downlink control L1/L2 signaling associated with the handover procedure and prior to reception of the message indicating the termination of the handover procedure; and wherein the message indicating the termination of the handover procedure is one of an HO complete message and a Feedback (ACK/NACK) message.

10. A network using radio transmission adapted for performing a handover procedure of a user terminal from a first base station to a second base station, wherein said network comprises at least one base station operative to:

send downlink transmission of u-plane user data to the user terminal before reception of a message indicating termination of the handover procedure;

receive at least one uplink feedback message associated to downlink transmission of said u-plane user data from the user terminal, wherein the at least one uplink feedback message is an acknowledgment (ACK) or a negative acknowledgment (NACK) received from the user terminal independent of receipt of uplink u-plane user data from the user terminal; and to use said at least one uplink feedback message as an indication of the presence of the user terminal within a range of the base station;

wherein the at least one base station sends u-plane user data to the user terminal after any uplink or downlink control L1/L2 signaling associated with the handover procedure and prior to reception of the message indicating the termination of the handover procedure; and wherein the message indicating the termination of the handover procedure is one of an HO complete message and a Feedback (ACK/NACK) message.

11. A method according to claim 1, wherein the u-plane user data sent by the target base station to the user terminal before reception of the message indicating the termination of the handover procedure includes voice data.

12. A base station according to claim 9, wherein the u-plane user data sent by the base station to the user terminal before reception of the message indicating the termination of the handover procedure includes voice data.

13. A network according to claim 10, wherein the u-plane user data sent by the at least one base station to the user terminal includes voice data.

14. A method according to claim 1, further comprising:
using the target base station, receiving a handover complete message after sending the u-plane user data to the user terminal, wherein the handover complete message is received independent of receipt of uplink u-plane user data from the user terminal.

15. A base station according to claim 9, wherein said base station is operative to receive a handover complete message after sending the u-plane user data to the user terminal, wherein the handover complete message is received independent of receipt of uplink u-plane user data from the user terminal.

16. A network according to claim 10, wherein the at least one base station is operative to receive a handover complete message after sending the u-plane user data to the user terminal, wherein the handover complete message is received independent of receipt of uplink u-plane user data from the user terminal.

* * * * *